United States Patent
Ames et al.

(10) Patent No.: US 11,606,450 B2
(45) Date of Patent: Mar. 14, 2023

(54) STRUCTURAL SUPPORT MEMBER FOR A DATA PORT OF A DEVICE HOUSING

(71) Applicant: Apple Inc., Cupertino, CA (US)

(72) Inventors: Logan M. Ames, Palo Alto, CA (US); Lucy E. Browning, San Francisco, CA (US); Martin J. Auclair, Campbell, CA (US); Ricky C. Lee, Arcadia, CA (US); Paul U. Leutheuser, Saratoga, CA (US); Yaocheng Zhang, Sunnyvale, CA (US); John J. Baker, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/271,665

(22) Filed: Feb. 8, 2019

(65) Prior Publication Data
US 2020/0084306 A1    Mar. 12, 2020

Related U.S. Application Data

(60) Provisional application No. 62/729,822, filed on Sep. 11, 2018.

(51) Int. Cl.
*H04M 1/02* (2006.01)
*B29C 70/84* (2006.01)
*B29L 31/34* (2006.01)

(52) U.S. Cl.
CPC ........ *H04M 1/0249* (2013.01); *H04M 1/0266* (2013.01); *B29C 70/845* (2013.01);
(Continued)

(58) Field of Classification Search
CPC .................. H04M 1/0249; H04M 1/0266
See application file for complete search history.

(56) References Cited

U.S. PATENT DOCUMENTS

| | | |
|---|---|---|
| 5,002,184 A | 3/1991 | Lloyd |
| 6,052,279 A | 4/2000 | Friend et al. |

(Continued)

FOREIGN PATENT DOCUMENTS

| | | |
|---|---|---|
| CN | 101329150 | 12/2008 |
| CN | 101436731 | 5/2009 |

(Continued)

OTHER PUBLICATIONS

Office Action issued in China Application No. CN201910465803.7, dated Sep. 3, 2020 in 8 pages.

(Continued)

*Primary Examiner* — Muthuswamy G Manoharan
(74) *Attorney, Agent, or Firm* — Kilpatrick Townsend and Stockton, LLP

(57) ABSTRACT

This disclosure describes features and methods of formation of a data port for a portable electronic device. The portable electronic device includes a device housing having a wall defining a data port opening. An anchoring feature is formed along a portion of the wall defining the data port opening. A structural support member is positioned within the data port opening and reinforces the data port opening. A polymer material fills a gap between the structural support member and a portion of the wall defining the data port opening. The polymer material engages the anchoring feature to retain the structural support member within the data port opening.

18 Claims, 14 Drawing Sheets

(52) U.S. Cl.
CPC .......... *B29L 2031/3437* (2013.01); *B29L 2031/3481* (2013.01)

(56) References Cited

U.S. PATENT DOCUMENTS

| | | | |
|---|---|---|---|
| 6,089,910 A | 7/2000 | Suzuki et al. | |
| 6,178,096 B1 | 1/2001 | Flickinger et al. | |
| 6,229,695 B1 | 5/2001 | Moon | |
| 6,254,428 B1 | 7/2001 | Murakami et al. | |
| 6,361,357 B1 | 3/2002 | Stillwell et al. | |
| 6,388,877 B1 | 5/2002 | Canova, Jr. et al. | |
| 6,625,013 B2 | 9/2003 | Minaguchi et al. | |
| 7,209,113 B2 | 4/2007 | Park | |
| 7,481,664 B1 | 1/2009 | Knoll et al. | |
| 7,517,258 B1 | 4/2009 | Taylor | |
| 7,652,892 B2 | 1/2010 | Shiu et al. | |
| 7,753,701 B2 | 7/2010 | Tsuji | |
| 7,758,369 B2 | 7/2010 | Miller et al. | |
| 7,933,123 B2 | 4/2011 | Wang et al. | |
| 8,204,561 B2 | 6/2012 | Mongan et al. | |
| 8,342,325 B2 | 1/2013 | Rayner | |
| 8,542,482 B2 | 9/2013 | Hsiung | |
| 8,804,353 B2 | 8/2014 | Montevirgen et al. | |
| 9,099,856 B2 | 8/2015 | Uttermann et al. | |
| 10,019,029 B1* | 7/2018 | Yu | G06F 1/1626 |
| 2003/0049964 A1 | 3/2003 | Pogliani | |
| 2004/0240162 A1 | 12/2004 | Hsu et al. | |
| 2005/0032415 A1 | 2/2005 | Sakamoto | |
| 2007/0206365 A1 | 9/2007 | Shiu et al. | |
| 2007/0207680 A1 | 9/2007 | Chen et al. | |
| 2008/0050935 A1 | 2/2008 | Tsuji et al. | |
| 2009/0059492 A1 | 3/2009 | Glover | |
| 2009/0080153 A1 | 3/2009 | Richardson et al. | |
| 2009/0257189 A1 | 10/2009 | Wang et al. | |
| 2009/0257817 A1 | 10/2009 | Chu et al. | |
| 2009/0269962 A1 | 10/2009 | Miller et al. | |
| 2010/0035476 A1 | 2/2010 | Wu et al. | |
| 2010/0178957 A1 | 7/2010 | Chen | |
| 2010/0323562 A1 | 12/2010 | Yash | |
| 2011/0034063 A1 | 2/2011 | Su et al. | |
| 2011/0068665 A1 | 3/2011 | Cao | |
| 2011/0076883 A1* | 3/2011 | Jol | H01R 43/24 439/521 |
| 2011/0086544 A1 | 4/2011 | Yoshioka et al. | |
| 2012/0008292 A1 | 1/2012 | Nichols et al. | |
| 2012/0064776 A1 | 3/2012 | Zhu et al. | |
| 2012/0171898 A1 | 7/2012 | Wang et al. | |
| 2012/0181317 A1 | 7/2012 | Evens et al. | |
| 2013/0188312 A1 | 7/2013 | Rayner | |
| 2014/0014408 A1 | 1/2014 | Milheiro et al. | |
| 2014/0069713 A1 | 3/2014 | Golko et al. | |
| 2014/0069714 A1* | 3/2014 | Uttermann | H01R 13/516 174/650 |
| 2014/0078671 A1 | 3/2014 | Hong | |
| 2014/0192481 A1 | 7/2014 | Wojcik et al. | |
| 2015/0001364 A1* | 1/2015 | Golko | H01R 13/748 248/315 |

FOREIGN PATENT DOCUMENTS

| | | |
|---|---|---|
| CN | 201252244 | 6/2009 |
| CN | 102017327 | 4/2011 |
| CN | 102437492 | 5/2012 |
| CN | 105322355 A | 2/2016 |
| CN | 107026359 A | 8/2017 |
| CN | 108448316 * | 2/2018 |
| GB | 2361114 | 10/2001 |
| JP | 2007127206 | 5/2007 |
| TW | M400721 | 3/2011 |
| WO | 2014042858 | 3/2014 |
| WO | 2014042859 | 3/2014 |
| WO | 2014042860 | 3/2014 |

OTHER PUBLICATIONS

Office Action issued in Chin Application No. CN201910465803.7, dated Aug. 11, 2021 in 5 pages.

* cited by examiner

C-C

STRUCTURAL SUPPORT MEMBER FOR A DATA PORT OF A DEVICE HOUSING

CROSS REFERENCES TO RELATED APPLICATIONS

This application claims priority to U.S. Provisional Patent Application No. 62/729,822, filed on Sep. 11, 2018, the disclosure of which is hereby incorporated by reference in its entirety for all purposes.

FIELD

This disclosure generally relates to data ports for electronic devices. In particular, methods and apparatus for supporting a structural support member within a data port with insert molded polymer material are described.

BACKGROUND

User demand for higher performance and functionality for their portable electronic devices have driven device makers to continually look for additional ways to squeeze extra performance into a device that remains portable. One way in which performance is being enhanced is increasing the area across which an active display area of a display assembly extends. Unfortunately, various components arranged around the edge of the device can interfere with extending the display assembly to the edge of the device. Consequently, ways of securing these components in place without blocking the placement of the display assembly is desirable.

SUMMARY

This disclosure describes various methods by which polymer material can be used to support a structural support member within an I/O port opening.

A portable electronic device is described and includes the following: a device housing including a wall defining a data port opening extending therethrough; a first anchoring feature formed along a portion of the wall defining the data port opening; a structural support member positioned within the data port opening and spaced apart from the portion of the wall defining the data port opening by a gap, the structural support member including a second anchoring feature; a polymer material filling the gap and engaging the first and second anchoring features to retain the structural support member within the data port opening; and a data port receptacle disposed within the device housing and aligned with the data port opening, the data port receptacle including electrical contacts.

A data port is described and includes the following: a wall defining a data port opening extending therethrough; a first anchoring feature formed along a portion of the wall defining the data port opening; a structural support member positioned within the data port opening, the structural support member including a second anchoring feature; and a polymer material filling a gap between the structural support member and the portion of the wall defining the data port, the polymer material engaging the first and second anchoring features to retain the structural support member within the data port opening and to form a water-resistant seal between the portion of the wall defining the data port opening and the structural support member.

A portable electronic device is described and includes the following: a device housing comprising a wall defining a data port opening; a first anchoring feature extending a portion of the wall defining the data port opening; a structural support member supported and fixed in place within the data port opening by the polymer material; a polymer material engaging the first anchoring feature; and a data port receptacle comprising electrical contacts, the data port receptacle being aligned with the data port opening and in abutting contact with the polymer material.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
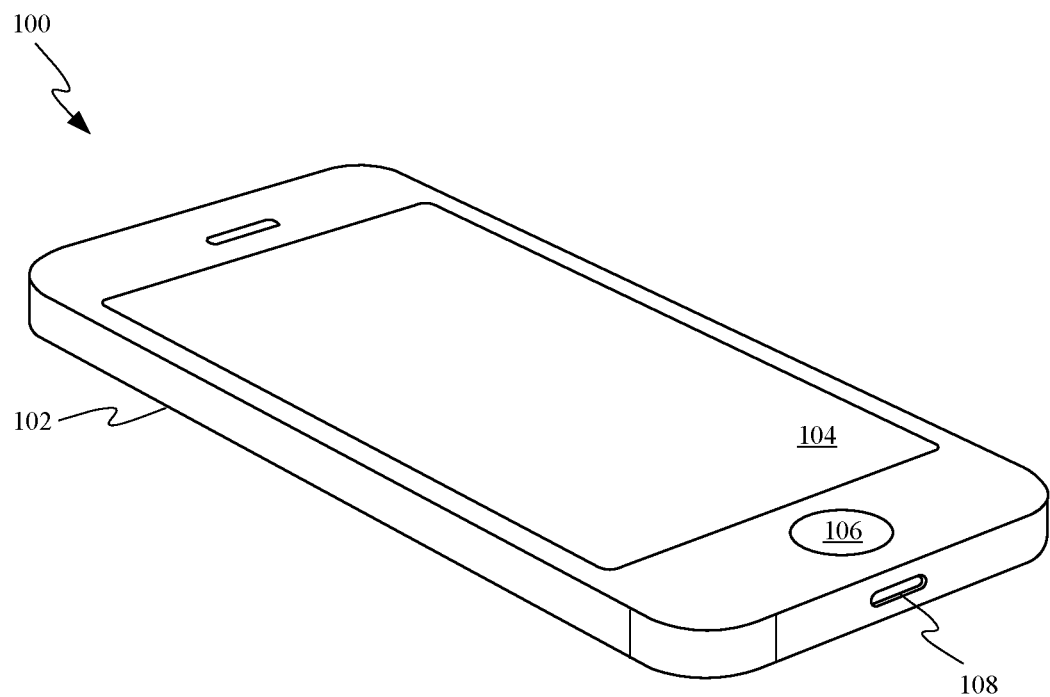
FIGS. 1A-1C show exemplary electronic devices suitable for use with the described embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Portable electronic devices can be formed from relatively soft materials such as polymers and aluminum that can be subject to becoming easily scratched or dented when used to line the interior of a data port receptacle. For this reason, a material with more robust material attributes can be used to line an interior of the data port receptacle. For example, a stainless steel structural support member could be used to line the interior of the data port receptacle. Positioning the structural support member within an opening of a device housing of the portable electronic device can require mounting hardware that takes up valuable space within the device housing.

One solution to this problem is to secure the structural support member within the data port receptacle with insert-molded material. A fixturing device can be used to precisely position the structural support member within a data port opening defined by a device housing. Once positioned within the opening by the fixturing device molten polymer material can be injected between the structural support member and portions of the device housing defining the data port opening. Once the polymer material solidifies, the fixturing device can be removed and the structural support member effectively floats within the data port opening supported only by the solidified polymer material.

Portions of the solidified polymer material and device housing located along an exterior of the portable electronic device can be co-finished during a machining operation so that the polymer material blends seamlessly in with exterior surfaces of the device housing. The polymer material also provides a seal between the device housing and the structural support member that helps to prevent water from intruding into the device housing from between the structural support member and the device housing. Excess portions of the polymer material positioned within interior areas of the device housing can be shaped to clear space for other components. For example, a portion of the polymer material adjacent to a display assembly of the portable electronic device can be removed to allow an active area of the display assembly to extend as close to an edge of the device housing as possible.

These and other embodiments are discussed below with reference to FIGS. 1-6; however, those skilled in the art will readily appreciate that the detailed description given herein with respect to these figures is for explanatory purposes only and should not be construed as limiting.

FIG. 1A shows a perspective view of an exemplary portable electronic device 100 suitable for use with the described embodiments. In particular, portable electronic device 100 includes device housing 102, which can be formed of metal or polymer materials. For example, device housing 102 can be formed from an aluminum alloy and/or stainless steel. Display assembly 104 is also depicted and can be configured to display a touch-sensitive user interface configured to receive commands from a user interacting with portable electronic device 100. In some embodiments, portable electronic device 100 can include push button 106, which can be configured to help a user navigate the user interface displayed by display assembly 104. In some embodiments, push button 106 can also include sensors for identifying a user of portable electronic device 100. Device housing 102 can define an opening to accommodate data port 108 for portable electronic device 100. Data port 108 can take many forms including various types of USB connectors or a lightning connector. Structures for supporting and positioning data port 108 can be disposed adjacent to and in some cases around a perimeter of the opening defined by device housing 102.

Figure 1B:
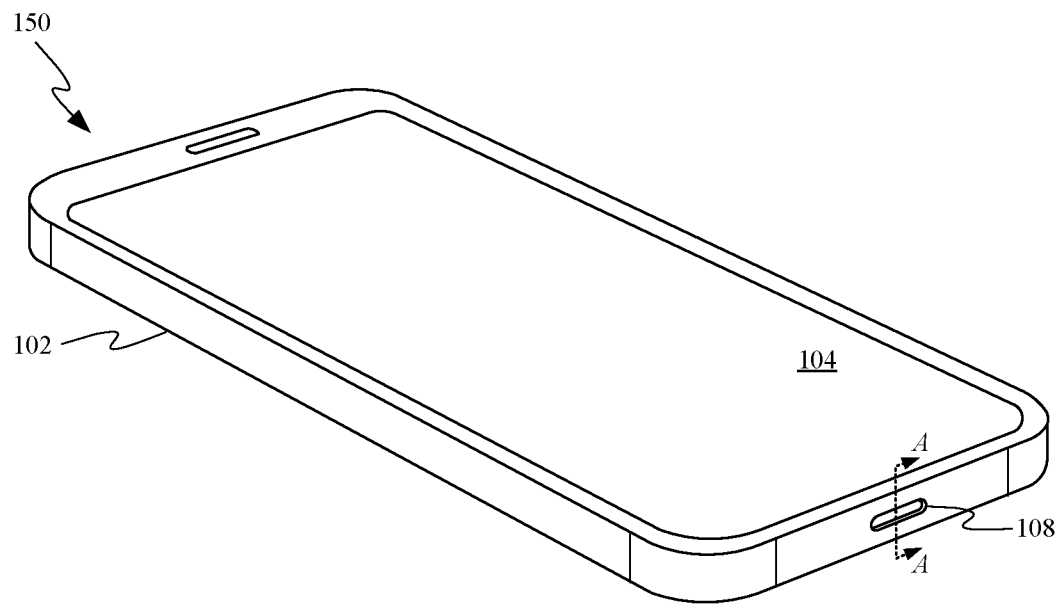

FIG. 1B depicts portable electronic device 150 suitable for use with the described embodiments. In particular, display assembly 104 can extend across a larger portion of portable electronic device 100 and come substantially closer to data port 108. For this reason, support structures associated with data port 108 should be adjusted to accommodate circuitry and components associated with display assembly 104. For example, components associated with display assembly 104 may protrude toward data port 108, thereby limiting an amount of space that can be occupied by any support structures associated with data port 108. In some embodiments, a support structure associated with data port 108 can also be utilized to support one end of display assembly 104.

Figure 1C:
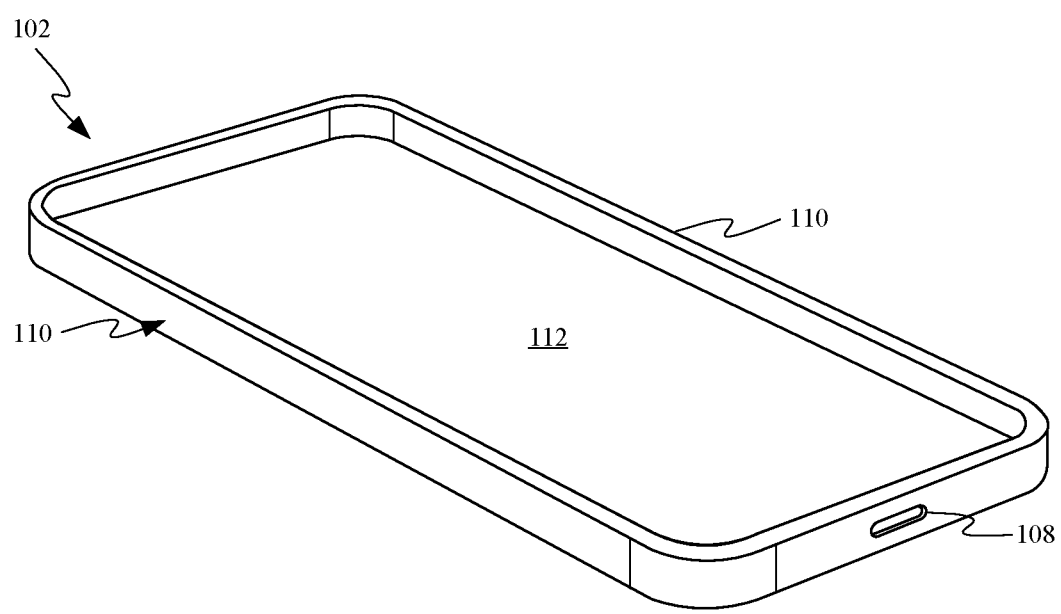

FIG. 1C shows device housing 102 with display assembly 104 removed. As depicted, device housing 102 can include four sidewalls 110 and a back wall 112. In some embodiments, back wall 112 can be integrally formed with sidewalls 110. In some embodiments, back wall 112 can be coupled to sidewalls 110 and formed at least in part from a radio transparent material that allows for the passage of wireless signals or inductive charging through back wall 112. For example, back wall 112 can be formed from both a metal reinforcing layer for structural support and a glass panel. In some embodiments, the metal reinforcing layer can be a steel lattice that includes one or more openings that accommodate the passage of wireless transmissions through back wall 112.

Figure 2A:
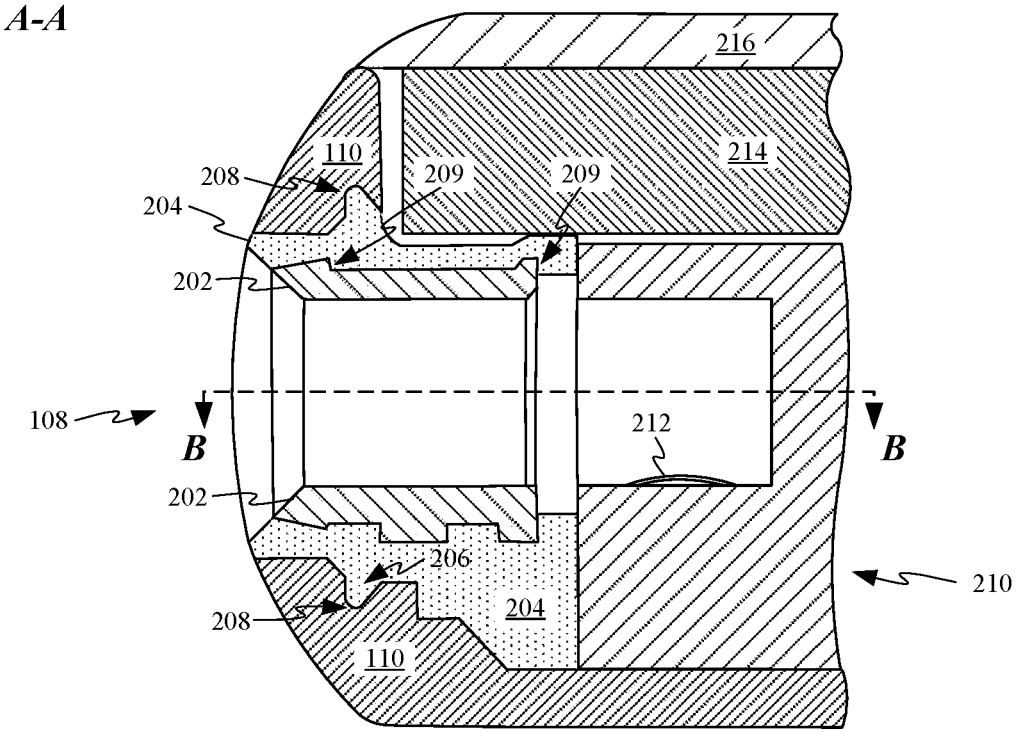
FIG. 2A shows a cross-sectional side view of a data port in accordance with section line A-A, as shown in FIG. 1B.

FIG. 2A shows a cross-sectional side view of data port 108 in accordance with section line A-A, as shown in FIG. 1B. Data port 108 includes a structural support member or structural support member 202 disposed within and following an interior surface of a data port opening defined by sidewall 110. Structural support member 202 floats within the data port opening and is supported by polymer material 204. Polymer material 204 includes a portion 206 that helps retain polymer material 204 within the data port opening by interacting with an anchoring feature taking the form of recessed groove 208 defined by sidewall 110. Polymer material 204 conforms with anchoring features of structural support member 202 taking the form of ridges 209. In this way, ridges/protrusions 209 can interlock with portions of polymer material 204 to help prevent movement of structural support member 202 relative to polymer material 204. In some embodiments, structural support member 202 can be entirely supported and retained by polymer material 204. Structural support member 202 and polymer material 204 also cooperatively define a chamfered opening region for receiving and guiding a data plug into data port 108. An exterior facing end of polymer material 204 prevents water from intruding between structural support member 202 and sidewall 110 and in this way acts as a water-resistant seal at an exterior surface of the device.

FIG. 2A also shows how a first portion of the exterior facing end of polymer material 204 is co-finished with sidewall 110 so that its curvature matches and is continuous with an adjacent portion of sidewall 110. A second portion of the exterior facing end of polymer material 204 has a flat chamfered geometry that helps guide a plug into data port 108 and matches a flat chamfered geometry of a forward portion of structural support member 202. An interior facing end of polymer material 204 abuts and seals to a portion of data port receptacle 210 to prevent any water intruding into data port 108 from exiting data port 108 and intrude into water sensitive areas within portable electronic device 100 or 150. Electrical contacts 212 within data port receptacle 210 can be water resistant such that any water disposed within data port 108 does not adversely affect operation of electrical contacts 212. Display assembly 214 can take the form of an LCD display, an OLED display, a MicroLED display, or other display suitable for use with a portable electronic device. Display assembly 214, as depicted, is affixed to an interior facing surface of cover glass 216 and is supported at least in part by a surface of polymer material 204. In this way, polymer material 204 provides structural support for structural support member 202 and display assembly 214. As a result of structural support member 202 being supported exclusively by polymer material 204, no flange feature is needed to protrude between sidewall 110 and display assembly 214, allowing display assembly 214 to extend almost all the way up to sidewall 110. In this way, an active display area of display assembly 214 can extend almost entirely to an outer edge of the portable electronic device. For example, a distance between the active display area and sidewall 110 could be less than 5 mm. Furthermore, polymer material 204 forms a cosmetic surface that creates an aesthetically pleasing transition between sidewall 110 and structural support member 202. Polymer material 204 can be formed from material such as polybutylene terephthalate (PBT) which has robust material properties allowing it to maintain its shape and surface consistency through anodizing or other surface finishing processes.

Figure 2B:
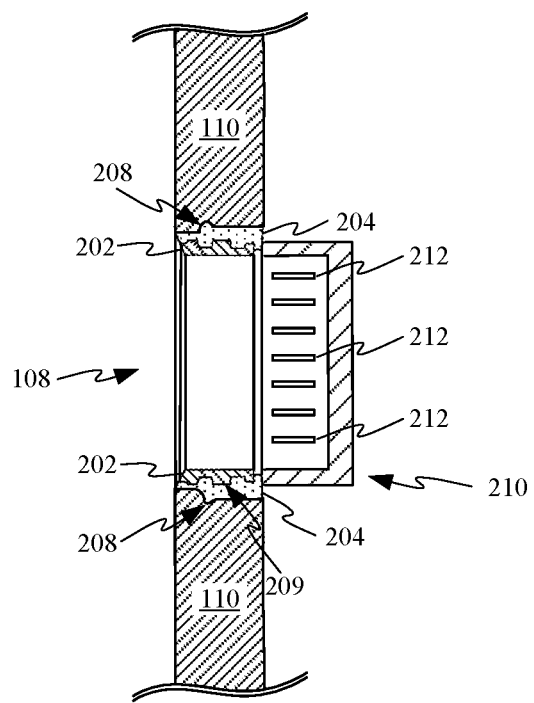
FIG. 2B shows a top view of the data port shown in FIGS. 1B and 2A.

FIG. 2B shows a top view of data port 108. In particular, FIG. 2B shows how lateral portions of structural support member 202 also include a series of ridges that help structural support member 202 stay engaged with and secured by polymer material 204. FIG. 2B also shows how recessed groove 208 extends along opposing lateral sides of the data port opening 108 defined by sidewall 110. A regular distribution of electrical contacts 212 is shown; however, it should be noted that other uneven distributions of electrical contacts 212 is possible and could be arranged in this manner for compatibility with particular connector plug types.

Figure 3A:
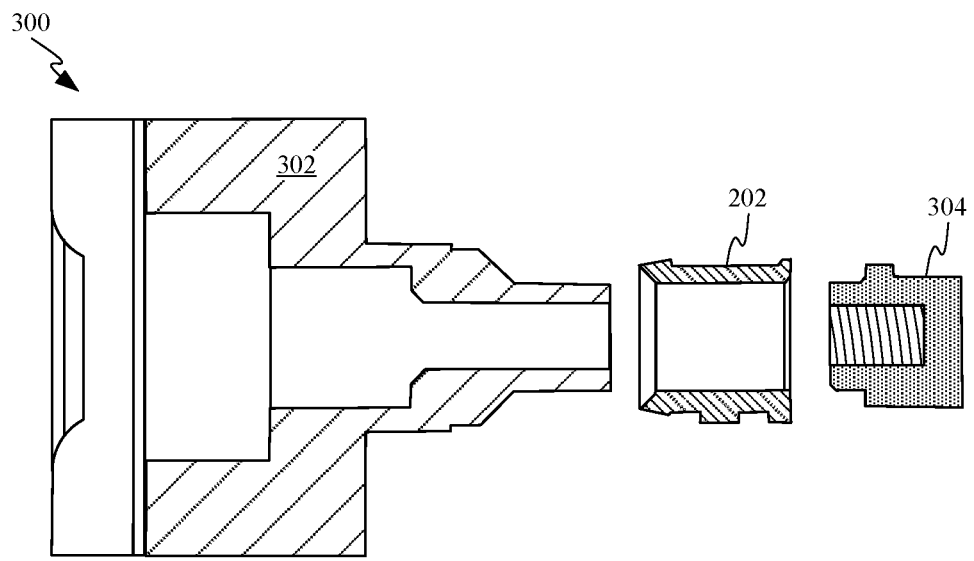
FIGS. 3A-3H show a process for manufacturing a data port.

FIGS. 3A-3H show a process for manufacturing data port 108. FIG. 3A shows a two piece fixturing device 300 that includes bracket 302 and threaded receiver 304. Bracket 302 defines a fastener opening sized to receive a fastener for coupling bracket 302 to threaded receiver 304. Bracket 302 includes an elongated protruding end sized to extend through a portion of central opening defined by structural support member 202. Likewise, threaded receiver 304 also is sized to extend through a portion of the central opening defined by structural support member 202.

Figure 3B:
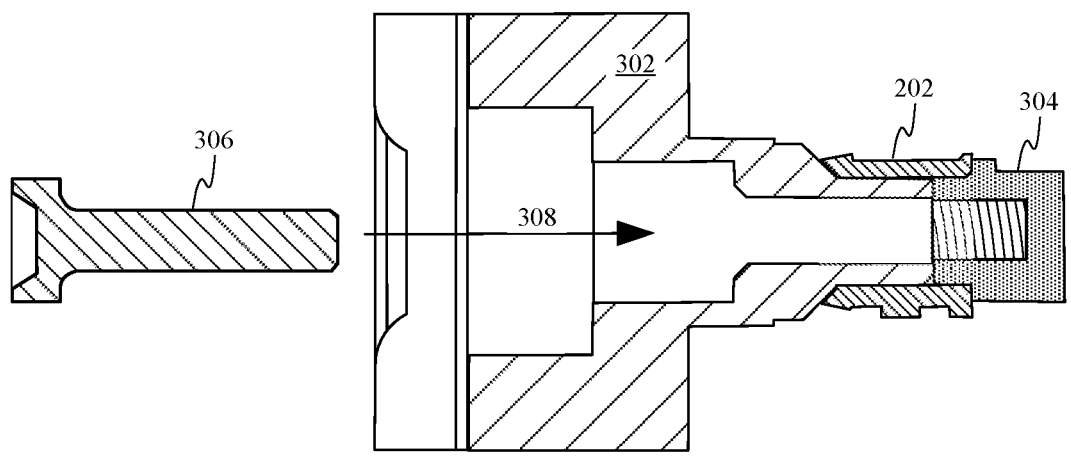

FIG. 3B shows how structural support member 202 can be secured between bracket 302 and threaded receiver 304. A fastener 306 is shown being aligned with the fastener opening of bracket 302. Arrow 308 shows how fastener 306 can be inserted within the fastener opening of bracket 302 to engage threading defined by threaded receiver 304.

Figure 3C:
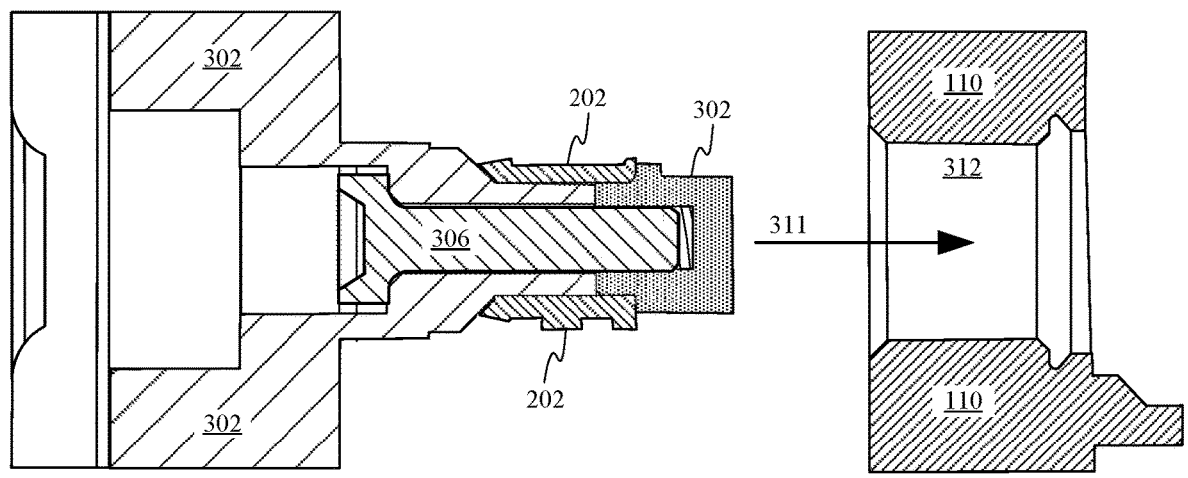
Figure 3D:
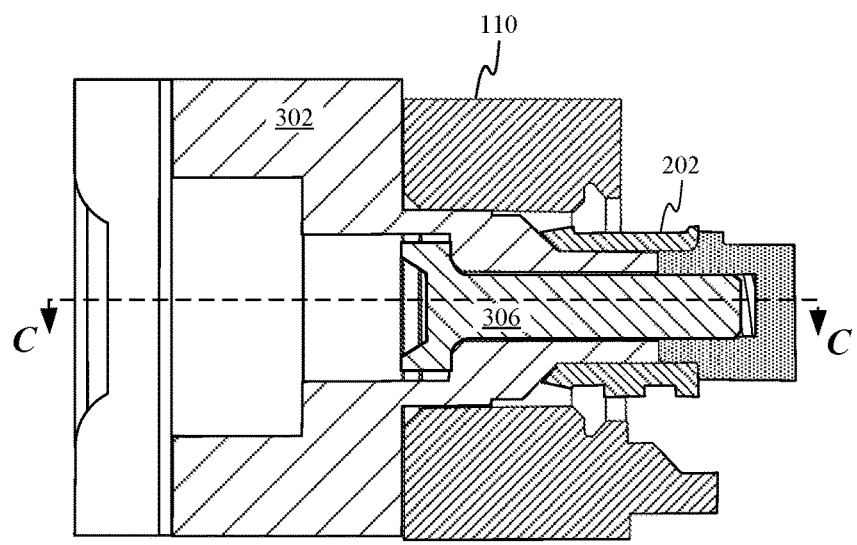

FIG. 3C, shows how fastener 306 fully engaged with the threaded opening of threaded receiver 304 couples bracket 302 and threaded receiver 304 together, thereby preventing any undesired movement of structural support member 202 relative to two piece fixturing device 300. FIG. 3C also shows arrow 311, which indicates how fixturing device 300 can be inserted within data port opening 312. FIG. 3D shows how fixturing device 300 can be positioned within data port opening 312 and how interaction between an outer surface of sidewall 110 and bracket 302 interact to precisely position structural support member 202 relative to data port opening 312.

Figure 3E:
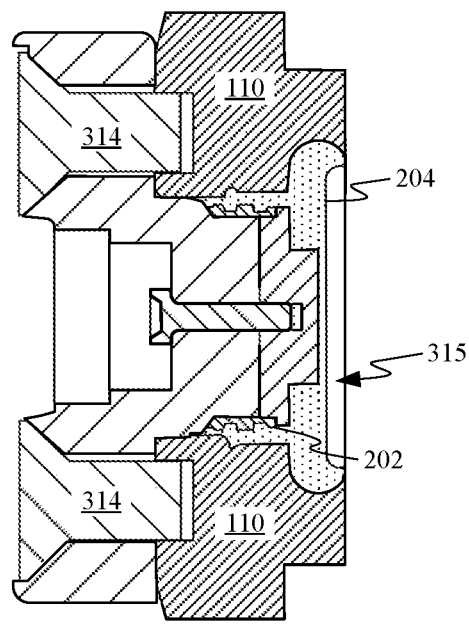

FIG. 3E shows a top down cross-sectional view of a portion of device housing 102 showing how fasteners 314 can engage threaded openings defined by sacrificial portions of sidewall 110 of device housing to prevent movement of two piece fixturing device 300 during an injection molding operation due to forces exerted by pressurized molten polymer material. Fasteners 314 can oppose forces exerted upon bracket 302 by pressurized molten polymer material 204 during an injection molding operation. Polymer material 204 is shown after being injected within a cavity 315 defined by sidewall 110. Polymer material 204 is shown extending between sidewall 110 and structural support member 202, thereby fixing a position of structural support member 202 centered horizontally within data port opening 312.

Figure 3F:
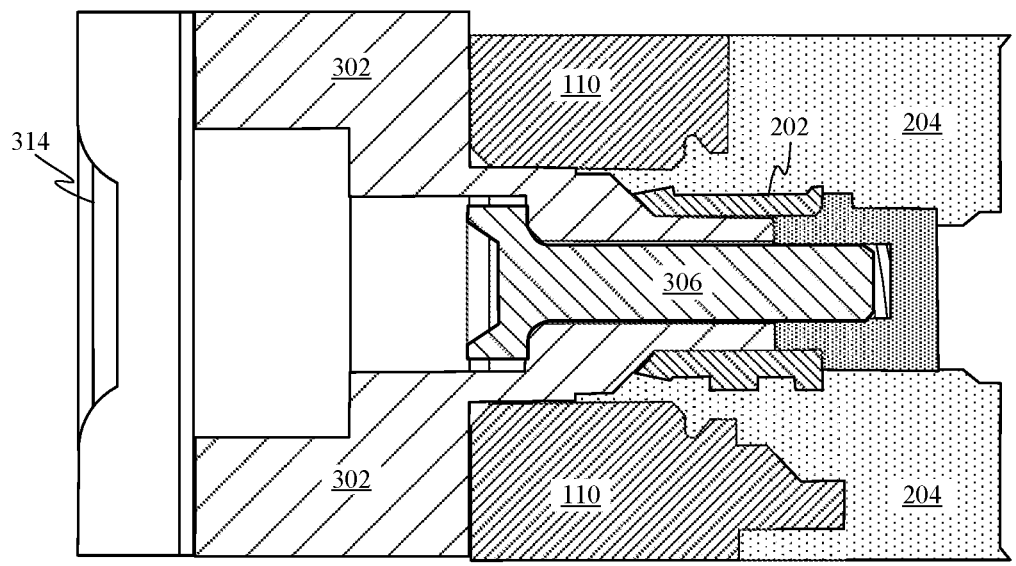

FIG. 3F shows a side view of structural support member 202 and how structural support member 202 is centered vertically within data port opening 312. Portions of polymer material 204 are shown filling a channel or channels defined by sidewall 110 such that once polymer material 204 is solidified, interaction between the portion of polymer material 204 and the channel prevents movement of structural support member 202 relative to sidewall 110.

Figure 3G:
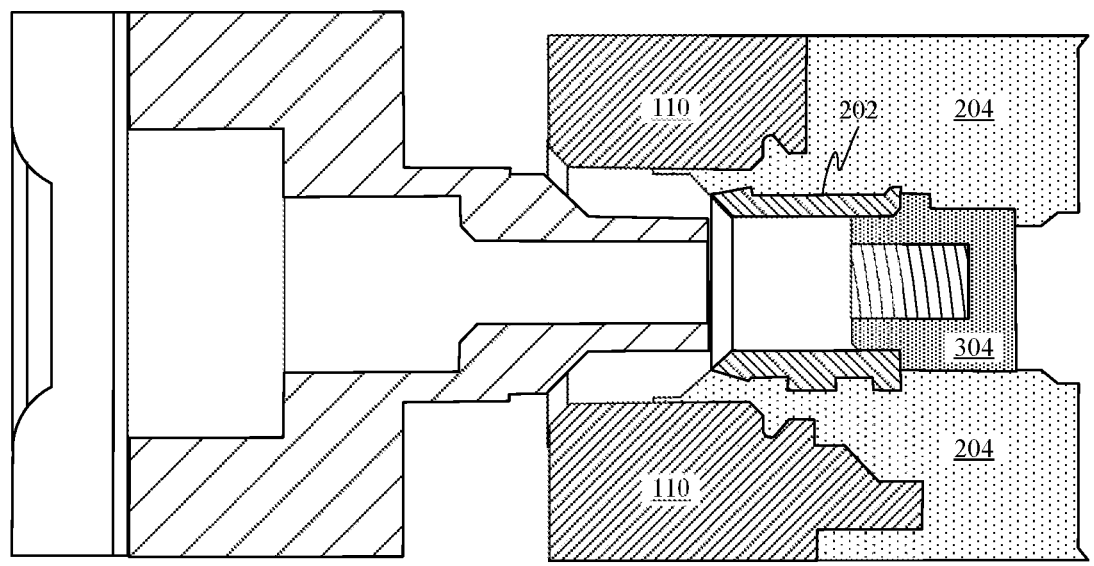
Figure 3H:
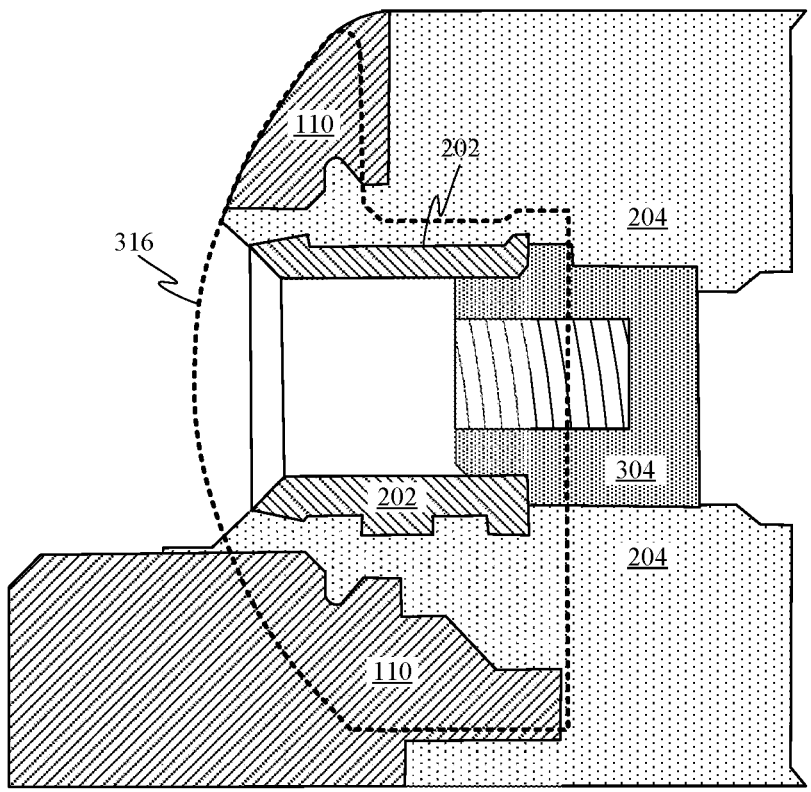

FIG. 3G shows how bracket 302 can be removed from data port opening 312 once fastener 306 is disengaged from bracket 302 and threaded receiver 304. Dashed line 316 of FIG. 3H shows how bracket 302 helps define a chamfered inlet leading into an interior volume defined by structural support member 202. A geometry of bracket 302 can be complementary to a chamfered geometry of structural support member 202 thereby minimizing any flash buildup upon structural support member 202. FIG. 3H shows how portions of sidewall 110 can be machined away to achieve a desired shape of sidewall 110 as shown by dashed lines 316. In some embodiments, threaded receiver 304 can be pulled out of structural support member 202 once an amount of polymer material 204 is machined away. FIG. 2A shows an exemplary final shape of sidewall 110 after undergoing a machining operation similar to the contour shown by dashed line 316.

Figure 4A:
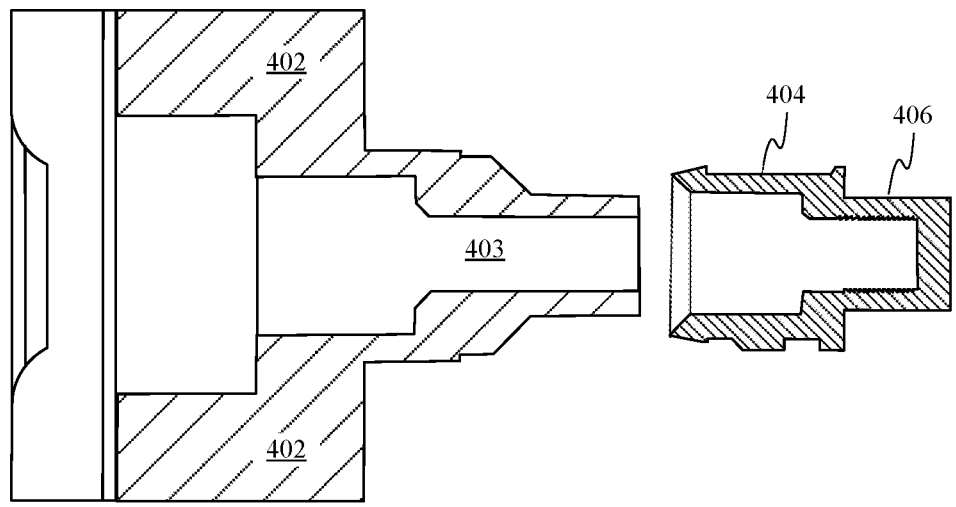
FIGS. 4A-4F show another process by which a structural support member can be installed within a data port opening.
Figure 4B:
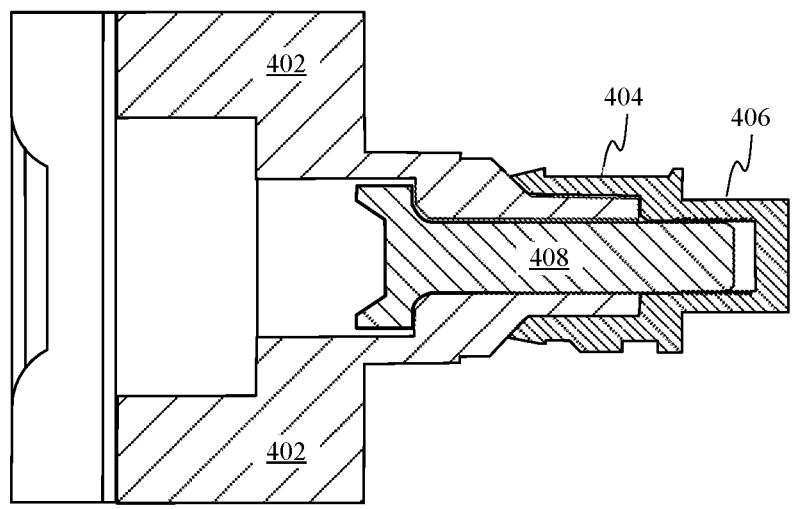

FIGS. 4A-4B show a manufacturing process using an alternate embodiment. FIG. 4A shows a single piece fixturing device 402. Single piece fixturing device 402 includes one or more fastener openings 403 for securing fixturing device 402 in place during a manufacturing operation. Single piece fixturing device 402 is used to position a structural support member 404 that includes a sacrificial threaded receiver region 406 in place within a data port opening. FIG. 4B shows fastener 408 extending through fastener opening 403 and engaging threading of sacrificial threaded receiver region 406, thereby securing fixturing device 402 directly to structural support member 404.

Figure 4C:
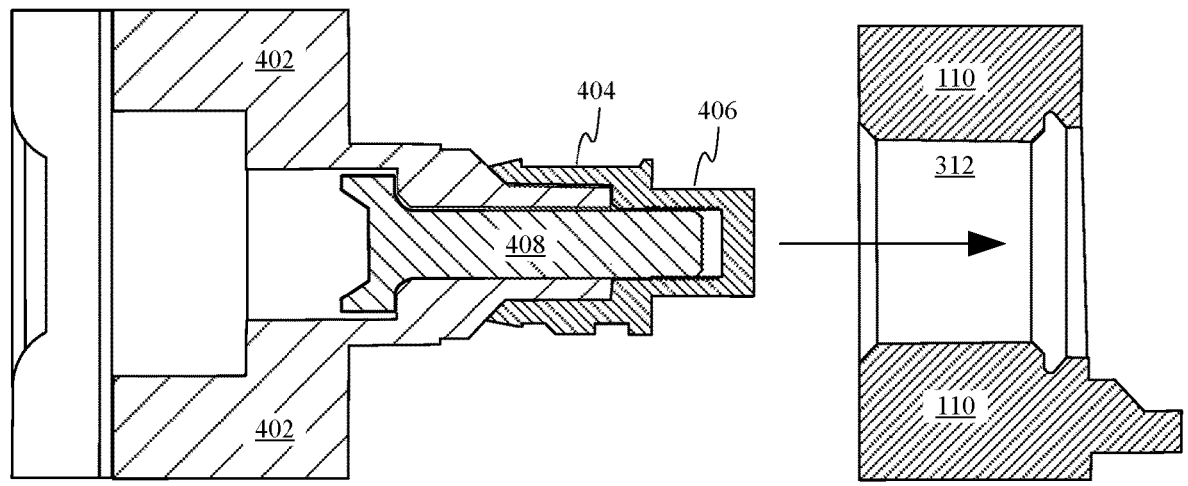
Figure 4D:
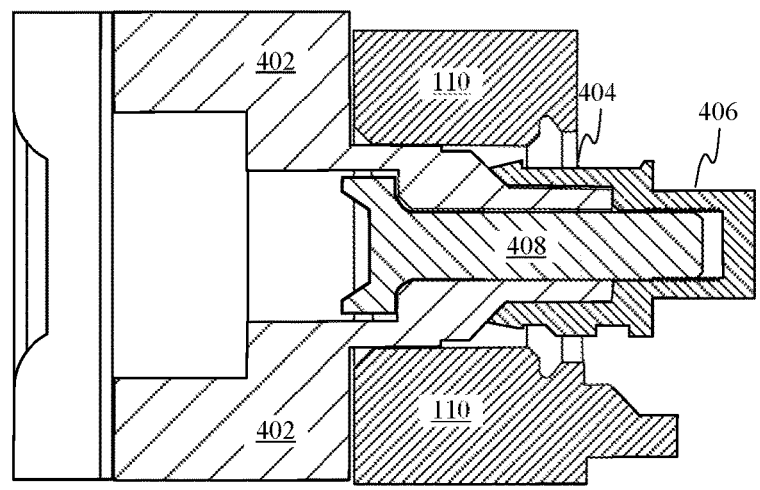

FIG. 4C shows how once fastener 408 is fully engaged with the sacrificial threaded receiver region 406 of structural support member 404, single piece fixturing device 402 and structural support member 404 can be secured together, thereby preventing any undesired movement of structural support member 404 relative to single piece fixturing device 402. FIG. 4C also includes an arrow showing how fixturing device 402 can be inserted within data port opening 312. FIG. 4D shows how fixturing device 402 can be positioned within data port opening 312 and how interaction between an outer surface of sidewall 110 and bracket 302 interact to precisely position structural support member 202 relative to data port opening 312. While not specifically depicted it should be appreciated that single piece fixturing device 402 can include openings that allow additional fasteners 408 to secure single piece fixturing device 402 to sidewall 110 (e.g. see FIG. 3E).

Figure 4E:
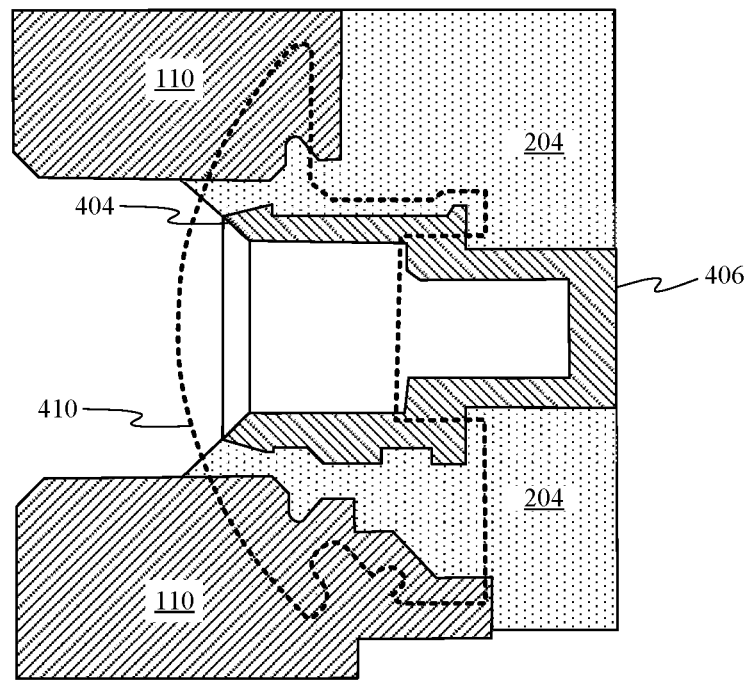
Figure 4F:
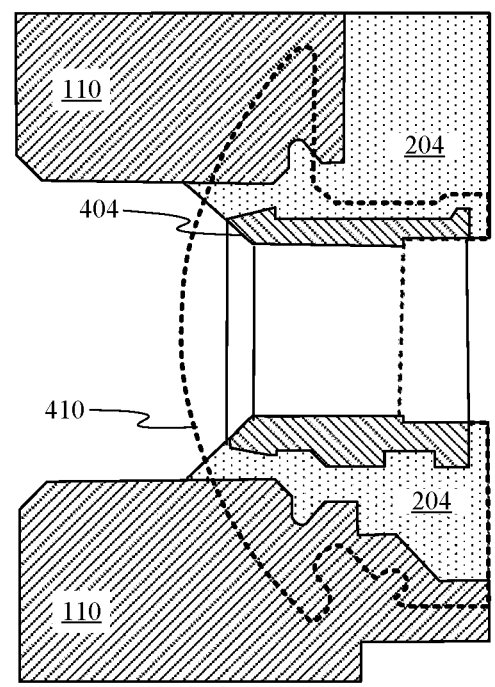

FIG. 4E shows structural support member 404 and its threaded receiver region 406 secured within polymer material 204. This embedding can be achieved in the same manner previously shown in FIGS. 3C-3G. Dashed line 410 identifies portions of sidewall 110, sacrificial threaded receiver region 406 and polymer material 204 that can be machined away to finalize the data port. FIG. 4F shows how a machining process can be used to remove sacrificial threaded receiver region 406. In this way, a rear end of structural support member 404 can be opened up to accommodate passage of a plug connector through structural support member 404. Additional portions of polymer material 204 and sidewall 110 are subsequently machined away to finalize the data port. A connector terminal assembly, such as connector terminal assembly 210 (see FIGS. 2A and 2B) can also be added to provide an electrical connection for a plug extending through the finalized data port.

Figure 5A:
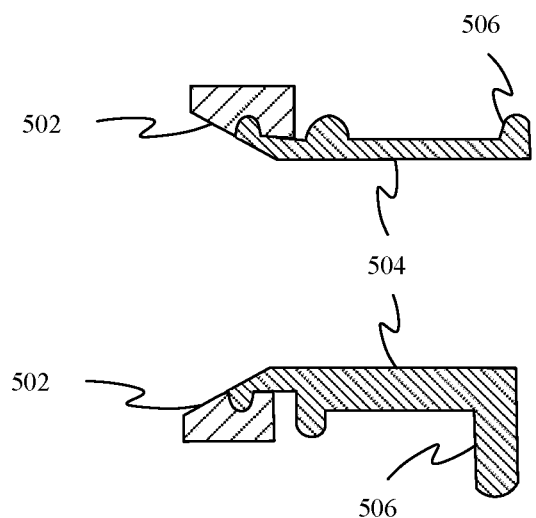
FIGS. 5A-5F show yet another process by which a structural support member can be installed within a data port opening.

FIGS. 5A-5F show how a structural support member can be installed within a data port opening. In particular, FIG. 5A shows how cosmetic trim material 502 can be insert molded around one end of a structural support member 504. Cosmetic trim material 502 can have material properties that make it better suited cosmetically than other polymer materials that could have, for example, better structural properties. Structural support member 504 can include multiple anchoring features 506 protruding from a main portion of structural support member 504.

Figure 5B:
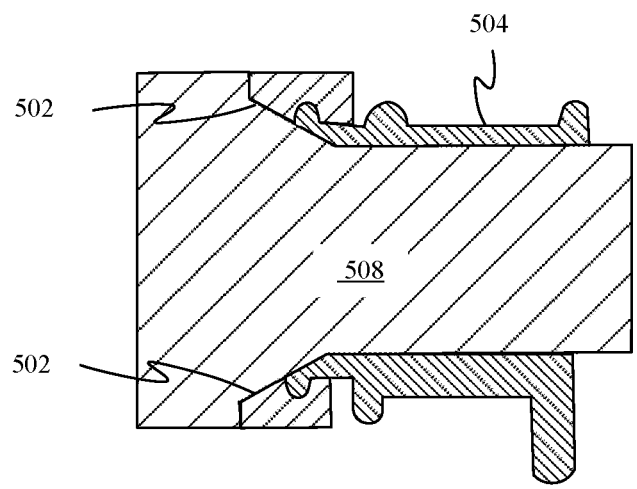
Figure 5C:
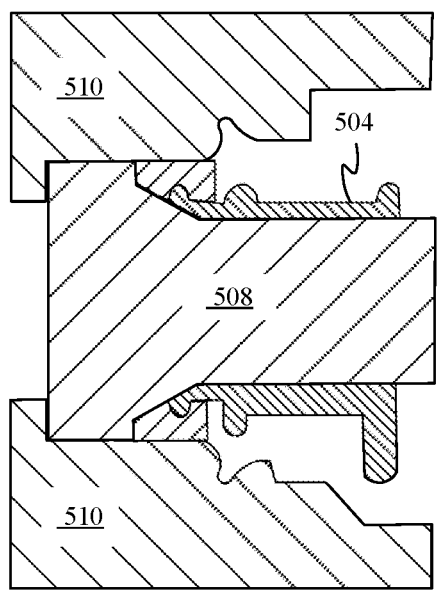

FIG. 5B shows how a plug 508 can be inserted through an opening defined by structural support member 504. A shape of plug 508 can be complementary to or slightly larger than the opening defined by structural support member 504. In this way, plug 508 can cover and mask interior walls defining the opening in structural support member 504. As depicted, a base of plug 508 can also match an outer perimeter of structural support member 504. FIG. 5C shows how plug 508 can be inserted into a cavity defined by housing material 510. The cavity can be sized to create an interference fit with plug 508 to prevent inadvertent movement of plug 508.

Figure 5D:
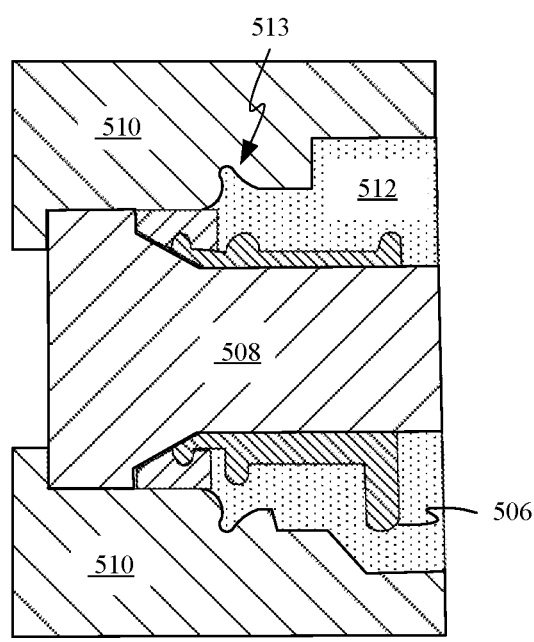
Figure 5E:
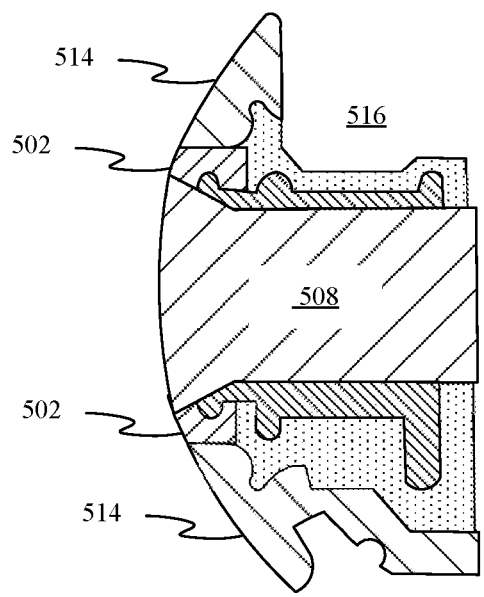
Figure 5F:
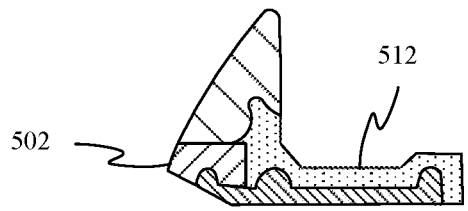
Figure 5F:
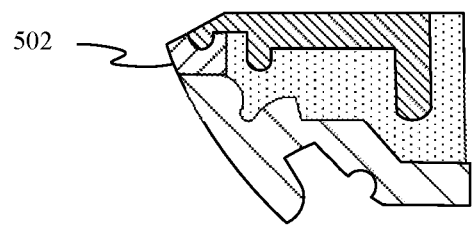

FIG. 5D shows how polymer material 512 can fill the space separating structural support member 504 and housing material 510. The pressure exerted by molten polymer material 512 exerted upon cosmetic trim material 502 and structural support member 504 can keep structural support member 504 firmly affixed within the cavity defined by housing material 510. Housing material 510 includes a recessed groove 513 that when filled by solidified polymer material 512 locks polymer material 512 in place relative to housing material 510. Similarly, anchoring feature 506 helps to prevent movement of structural support member 504 relative to polymer material 512. After undergoing the insert molding operation, FIG. 5E shows how excess housing material 510, cosmetic trim material 502 and polymer material 512 can be machined away to achieve a desired shape and size of data port region. In this way, a desired exterior geometry of housing 514 can be achieved and a curvature of housing 514 can match a curvature of cosmetic trim material 502. Polymer material 512 is also shaped to define a notch region 516 configured to accommodate a periphery of a display assembly. In some embodiments, polymer material 512 is shaped and positioned to support the display assembly. FIG. 5F shows plug 508 removed leaving a receptacle opening 518 free of polymer material and configured to receive a connector plug. In some embodiments, receptacle opening 518 can be sized to receive a plug connector such as a micro-USB connector, a lightning connector or a USB-C connector.

Figure 6:
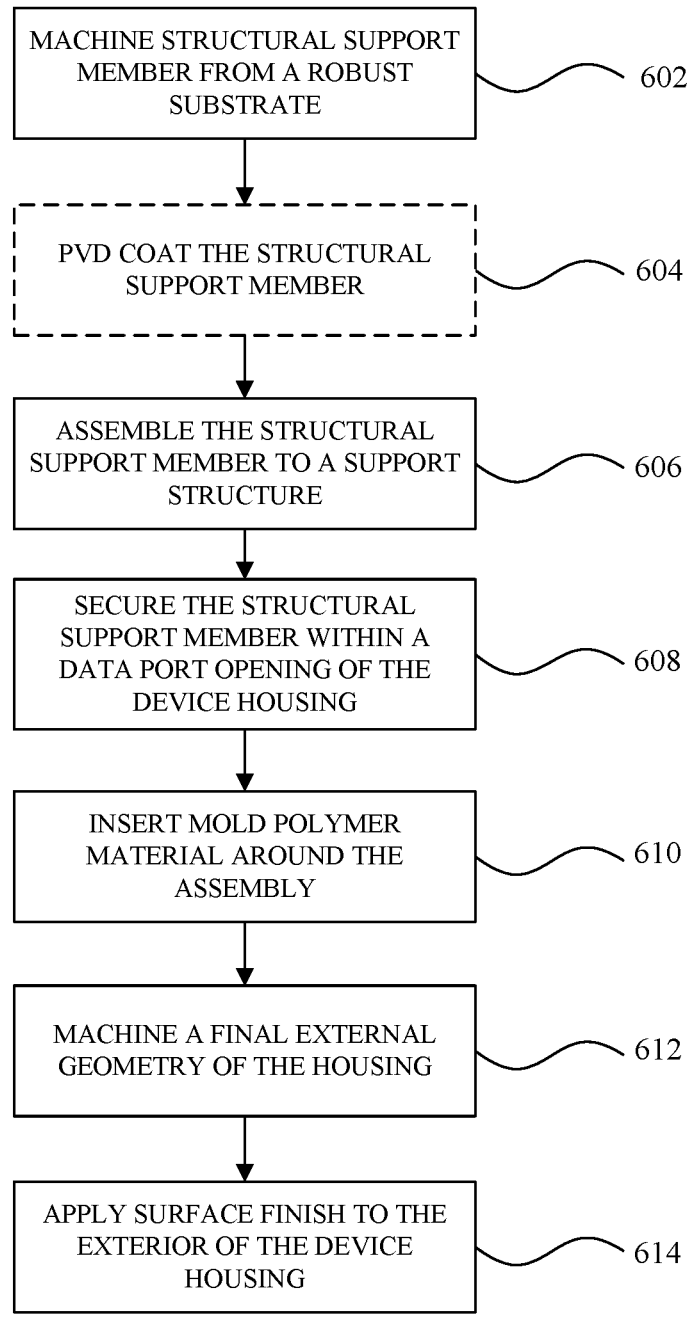
FIG. 6 shows a block diagram illustrating a method for installing a structural support member within a data port.

FIG. 6 shows a block diagram illustrating a method for installing a structural support member within a data port. At 602 a structural support member is machined from a robust material. In some embodiments, the structural support member can be formed from a stainless steel substrate while in other embodiments the structural support member can be formed from other robust materials such as carbon fiber, ceramic material, aluminum, magnesium, or titanium alloys. In general, the structural support member is designed to be at least as robust as the material being used for the device housing. For example, a stainless steel structural support member installed in an aluminum housing would wear better than a simple opening defined by the aluminum device housing itself. In some embodiments, the structural support member can be formed as part of a stamping operation. At 604 the structural support member can undergo an optional physical vapor deposition (PVD) operation that improves cosmetic and/or structural attributes of the structural support member. At 606, the structural support member can be assembled with a support structure. The support structure can operate as a fixture to keep the structural support member in place relative to a device housing.

At 608, the structural support member and at least a portion of the support structure is pressed or inserted into a data port opening defined by a sidewall of the device housing. The support structure can be affixed to the device housing in various ways such that movement of the structural support member relative to the housing is prevented. The support structure can also be configured to block the intrusion of polymer material into an opening defined by the structural support member. Alternatively, the structural support member itself can include a sacrificial portion that prevents the intrusion of polymer material into a central opening defined by the structural support member. In some embodiments, the support structure can be fastened to the device housing with screws that engage a sacrificial portion of the device housing (see FIG. 3E). In other embodiments, the support structure can be positioned within a sacrificial cavity defined by the device housing (see FIGS. 5C-5D). At 610, molten polymer material can be injected into a gap between the structural support member and portions of a wall of the device housing defining the data port. At 612, a machining operation can be applied to the device housing to achieve a final external geometry of the device housing. At 614, a surface finish can be applied to an exterior of the device housing. In some embodiments, the polymer material can also undergo the surface finishing operation. The surface finishing operation can take the form of a polishing operation or an anodization operation.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling the manufacturing or assembly operations described herein. The computer readable medium is any data storage device that can store data, which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users

What is claimed is:

1. A portable electronic device, comprising:
   a device housing including a wall defining a data port opening extending therethrough;
   an electrical receptacle connector positioned within the device housing, the electrical receptacle connector defining a cavity and a receiving opening for the cavity, wherein the electrical receptacle connector further includes a plurality of electrical contacts positioned within the cavity;
   a structural support member positioned within the device housing and extending from the data port opening to a distal end at the receiving opening, the structural support member defining a channel such that a corresponding plug connector can be inserted through the data port opening, through the channel, through the receiving opening and into the cavity of the receptacle connector;
   a polymer material disposed between an outside surface of the structural support member and an interior surface of the device housing, the polymer material engaging a recessed groove formed on the interior surface of the device housing and engaging a ridge formed on the outside surface of the structural support member wherein the groove and the ridge engage with the polymer material to retain and seal the structural support member within the device housing.

2. The portable electronic device as recited in claim 1, wherein the polymer material is in direct contact with both the device housing and the structural support member.

3. The portable electronic device as recited in claim 1, wherein the structural support member is recessed back from an exterior surface of the device housing.

4. The portable electronic device as recited in claim 1, wherein the polymer material fills the recessed groove.

5. The portable electronic device as recited in claim 4, wherein the ridge protrudes from the structural support member and into the polymer material to oppose movement of the structural support member relative to the polymer material.

6. The portable electronic device as recited in claim 1, further comprising:
   a display assembly configured to provide a user interface to a user of the portable electronic device, the display assembly being supported at least in part by a portion of the polymer material.

7. The portable electronic device as recited in claim 1, further comprising a display assembly having an active display area, a distance between an edge of the active display area and a portion of the wall defining the data port being less than 5 mm.

8. The portable electronic device as recited in claim 1, wherein the receptacle connector is in abutting contact with the polymer material.

9. The portable electronic device as recited in claim 1, wherein the polymer material comprises a first material positioned at an exterior surface of the device housing and a second material abutting the first material and separating the first material from an interior of the device housing.

10. An electronic device, comprising:
    a housing including a receiving aperture;
    a structural support member positioned within the housing and extending from the receiving aperture to a distal end, the structural support member defining a channel extending there through, the channel aligned with the receiving aperture;
    an electrical receptacle connector positioned adjacent the distal end of the structural support member and including a receiving opening aligned with the channel such that a plug connector can pass through the receiving aperture, through the channel, through the receiving opening and into the receptacle connector, wherein the electrical receptacle connector includes a plurality of electrical contacts;
    a polymer material filling a gap between an exterior surface of the structural support member and an interior portion of the electronic device, the polymer material engaging a recessed groove formed on the interior portion of the housing and engaging a ridge formed on the outside surface of the structural support member, wherein the groove and the ridge engage with the polymer material to retain and seal the structural support member within the housing.

11. The electronic device as recited in claim 10, wherein the polymer material extends into the groove.

12. The electronic device as recited in claim 10, wherein the polymer material electrically insulates the structural support member from the housing.

13. The electronic device as recited in claim 10, wherein the gap is a uniform distance.

14. The electronic device as recited in claim 10, wherein the structural support member is formed from stainless steel and the housing is formed from an aluminum alloy.

15. A portable electronic device, comprising:
    a device housing defining a receiving aperture sized to receive a mating connector;
    a structural support member positioned within the device housing and extending from the receiving aperture to a distal end;
    an electrical receptacle connector positioned within the device housing and located adjacent the distal end of the structural support member, wherein the electrical receptacle connector includes a plurality of electrical contacts; and
    a polymer material disposed between an outside surface of the structural support member and an interior surface of the device housing, the polymer material engaging a recessed groove formed on the interior surface of the device housing and engaging a ridge formed on the outside surface of the structural support member, wherein the groove and the ridge engage with the polymer material to retain and seal the structural support member within the device housing.

16. The portable electronic device as recited in claim 15, wherein a curvature of a portion of the polymer material at an exterior surface of the device housing matches a curvature of an exterior portion of the device housing adjacent to the receiving aperture.

17. The portable electronic device as recited in claim 15, wherein the polymer material prevents passage of water from the receptacle connector into other portions of the device housing.

18. The portable electronic device as recited in claim 15, wherein the polymer material and the structural support member cooperatively define a chamfered opening leading into a central opening defined by the structural support member.

* * * * *